(12) United States Patent
Lu

(10) Patent No.: US 9,384,169 B2
(45) Date of Patent: Jul. 5, 2016

(54) NUMERICAL METHOD FOR SOLVING AN INVERSE PROBLEM IN SUBSONIC FLOWS

(71) Applicant: Ming Lu, Tianjin (CN)

(72) Inventor: Ming Lu, Tianjin (CN)

(73) Assignee: Xi'an Virtual-Dynamics Simulation Technology Inc., Xi'an (CN)

( * ) Notice: Subject to any disclaimer, the term of this patent is extended or adjusted under 35 U.S.C. 154(b) by 2 days.

(21) Appl. No.: 13/985,047

(22) PCT Filed: Sep. 18, 2012

(86) PCT No.: PCT/CN2012/081519
§ 371 (c)(1),
(2) Date: Aug. 13, 2013

(87) PCT Pub. No.: WO2014/043847
PCT Pub. Date: Mar. 27, 2014

(65) Prior Publication Data
US 2015/0186333 A1 Jul. 2, 2015

(51) Int. Cl.
*G06F 7/60* (2006.01)
*G06F 17/10* (2006.01)
*G06F 17/16* (2006.01)
*G06F 17/13* (2006.01)
*G06F 17/50* (2006.01)

(52) U.S. Cl.
CPC ............... *G06F 17/16* (2013.01); *G06F 17/13* (2013.01); *G06F 17/5009* (2013.01); *G06F 17/5018* (2013.01); *G06F 2217/08* (2013.01); *G06F 2217/46* (2013.01)

(58) Field of Classification Search
CPC ..... G06F 17/13; G06F 17/16; G06F 17/5009; G06F 17/5018; G06F 2217/46; G06F 2217/08

USPC ...................................................... 703/2, 8, 6
See application file for complete search history.

(56) References Cited

U.S. PATENT DOCUMENTS 5,926,399 A * 7/1999 Berkooz ............. G06F 17/5018
703/7

OTHER PUBLICATIONS

Verhoff, A. et al., "Hodograph Solution for Compressible Flow Past a Corner and Comparison with Euler Numerical Predictions", 1991, Americal Institute of Aeronautics and Astronautica, Inc.*
Lu, Ming, "A Langrangian Formulation of the Euler Equations for Subsonic Flows", 2007, Department of Mechanical Engineering, McGill University.*
Verhoff, A. et al., "Hodograph Solution for Compressible Flow Past a Corner and Comparison with Euler Numerical Predictions", 1991, American Institute of Aeronautics and Astronautica, Inc.*
Nguyen, T.T. et al., "Liquid Fuel Jet in Subsonic Crossflow", Jan.-Feb. 1992, J. Propulsion, vol. 8, No. 1, AIAA 28th Aerospace Sciences Meeting, American Institute of Aeronautics and Astronautics, Inc.*
Mateescu, Dan, "Analysis of Aerodynamic Problems with Geometrically Unspecified Boundaries Using an Enhanced Lagrangian Method", 2003, Journal of Fluids and Structures 17, Elsevier Science, Ltd.*

(Continued)

*Primary Examiner* — Cedric D Johnson

(57) ABSTRACT

It is a numerical method for solving an inverse problem about the shape design of aerodynamic body in inviscid subsonic flows. This method transfers the original Euler equations into the stream-function plane, where it solves the Riemann problem across the streamline presenting the solid-wall and obtains the geometry of the solid-wall concurrently.

8 Claims, 3 Drawing Sheets

(56) References Cited

OTHER PUBLICATIONS

Jameson, Antony, "Aerodynamic Shape Optimization Using the Adjoint Method", Feb. 6, 2003, Lectures at the Von Karman Institute.*

Stanitz, John D, "A Review of Certain Inverse Methods for the Design of Ducts with 2- or 3-Dimensional Potential Flow", Jun. 6, 1988, Appl. Mech. Rev. vol. 41, No. 6, American Society of Mechanical Engineers.*

Antony Jameson, A.: Aerodynamic Shape Optimization Using the Adjoin Method, Lecture Series at the Von Karman Institute, Feb. 6, 2003.

Mateescu D.: Analysis of Aerodynamic Problem with Geometrically Unspecified Boundaries Using an Enhanced Lagrangian Method. J. of Fluids and Structures, 17, pp. 603-626, 2003.

Stanitz, D. John: A Review of Certain Inverse Methods for the Design of Duct with 2-or 3-Dimensional Potential Flow. Appl. Mech. Rev. vol. 41, No. 6, Jun. 1988.

Verhoff, A. et al., "Hodograph Solution for Compressible Flow Past a Corner and Comparison with Euler Numerical Predictions", 1991, AIAA,inc.

Nguyen, T.T. et al., "Liquid Fuel Jet in Subsonic Crossflow", Jan.-Feb. 1992, J. of Propulsion, vol. 8, No. 1, AIAA 28th Aerospace Science Meeting, AIAA, inc.

* cited by examiner (a)

(b)

(c)

(d)

NUMERICAL METHOD FOR SOLVING AN INVERSE PROBLEM IN SUBSONIC FLOWS

FIELD OF THE INVENTION

This invention is belonged to computational fluid dynamics domain. Particularly it is a numerical method for solving a class of inverse problem, which is the shape design of aerodynamic body in inviscid subsonic flows. The invented method is implemented using computer language codes and the codes are run on computer to calculate the geometry shape of aerodynamic body based on given pressure distribution on the body.

BACKGROUND OF THE INVENTION

The typical inverse problem of aerodynamics is posed by specifying the pressure distribution on the solid-wall of aerodynamic body and determining the geometry of this solid-wall that realizes this pressure distribution. Generally, the numerical methods for this class of problems are implemented on the Eulerian plane, such as the adjoint method[1], in which we have to firstly estimate the unspecified body shape, then to generate a computing grid around this shape, and to solve the fluid flow governing equations and find the pressure distribution on the body. Next, a very important and time-consuming step is to solve the adjoint equation to modify the geometry shape. This process has to be repeated for several successive steps for shape modification until the final target geometry is reached.

The solving of the flow governing equations, like most current numerical methods did, are implemented on the Cartesian coordinator (the Eulerian plane), where need to generate the computing grid in advance according to the body geometries. For this inverse problem, it needs to re-generate the computing grid since the body geometry keeps being modified. In addition, the smoothness and orthogonality operation for the computing grid, the current numerical methods for this class of inverse problems are very time-consumed.

For inviscid flows, the solid-wall boundary of aerodynamic body is a streamline and any streamline in flow field has its own stream-function with a constant value. It is more suitable to work the unspecified geometry problem on a stream-function plane. There no need to modify the computing grid like that in the adjoint method, since the unspecified shape (solid-wall boundaries) are always represented by streamlines, so that the computing grid will keep on the same in anytime, no matter the geometry of the body shape how to change. This property of solving the geometry shape design problem in the stream-function plane comes to the most efficient process.

However, it was limited in supersonic flows simulation before[2]. When the Euler equations are numerically solved in the stream-function plane, they spatially evolve downstream, there is no any upstream information need to consider, which therefore perfectly follows the physical characteristics in supersonic flows. Until recently, for the subsonic or low speed flow domain, using the advantage of the stream function as one coordinate working on the inverse shape design problems is only for potential flows (inviscid, irrotational, incompressible) and linearized compressible flows[3].

There is an apparent need to the optimal process in shape design. Some industrial applications, such as two-dimensional inviscid subsonic flow simulations and design cases for nozzle and airfoil, are common, useful and necessary in the preliminary phase of product design.

DETAILED DESCRIPTION OF PARTICULAR EMBODIMENTS OF THE INVENTION

This invention firstly provides a coordinate transformation from the two-dimensional Eulerian plane expressed with (t, x, y) to the stream-function plane expressed with $(\tau, \lambda, \xi)$. In the Eulerian plane, the variable t presents the time direction, x, y present two Cartesian coordinator direction; while in the stream-function plane, $\tau$ has the same definition as t, and is the stream-function with the dimension $[m^2 \cdot s^{-1}]$; $\lambda$ is the particle traveling distance.

the time-dependent Euler equations in differential conservation form in the Eulerian plane for two-dimensional unsteady inviscid compressible flows are written as $$\frac{\partial f}{\partial t} + \frac{\partial F}{\partial x} + \frac{\partial G}{\partial y} = 0, \quad (1)$$

where f is the conservation variables vector and; F, G are the convection fluxes in the x, y direction. In detail, $$f = \begin{bmatrix} \rho \\ \rho u \\ \rho v \\ \rho E \end{bmatrix}, F = \begin{bmatrix} \rho u \\ \rho u^2 + p \\ \rho uv \\ (\rho E + p)u \end{bmatrix}, G = \begin{bmatrix} \rho v \\ \rho uv \\ \rho v^2 + p \\ (\rho E + p)v \end{bmatrix}. \quad (2)$$

where the variables u, v, $\rho$ and p are respectively the components of flow velocity V in the x, y direction, fluid density and pressure. The total energy E and enthalpy H are $$E = \frac{1}{2}(u^2 + v^2) + \frac{1}{\gamma - 1}\frac{p}{\rho}, H = E + \frac{p}{\rho} = \frac{u^2 + v^2}{2} + \frac{\gamma}{\gamma - 1}\frac{p}{\rho}, \quad (3)$$

with $\gamma$ being the specific heat ratio.

The Jacobian matrix of the transformation from coordinates (t, x, y) to $(\tau, \lambda, \xi)$ is $$J = \frac{\partial(t, x, y)}{\partial(\tau, \lambda, \xi)} = \begin{bmatrix} 1 & 0 & 0 \\ u & \cos\theta & U \\ v & \sin\theta & V \end{bmatrix}, \quad (4)$$

and its determinant J is $$J = \begin{vmatrix} \cos\theta & U \\ \sin\theta & V \end{vmatrix} = V\cos\theta - U\sin\theta, \quad (5)$$

where $\theta$ is the flow direction angle; U, V, the stream-function geometry state variables with the dimension $[m^2 s \cdot kg^{-1}]$, are defined as $$U = \frac{\partial x}{\partial \xi}, V = \frac{\partial y}{\partial \xi}. \quad (6)$$

Finally, the two-dimensional time-dependent Euler equations (1) have been transformed into the ones in the stream-function plane $$\frac{\partial f_S}{\partial \tau} + \frac{\partial F_S}{\partial \lambda} + \frac{\partial G_S}{\partial \xi} = 0, \tag{7}$$

where $f_s$, $F_s$ and $G_s$ have the same definitions as f, F and G in (2) but in the stream-function plane with the subscript S. in detailed, $$f_S = \begin{bmatrix} \rho J \\ \rho Ju \\ \rho Jv \\ \rho JE \\ U \\ V \end{bmatrix}, F_S = \begin{bmatrix} 0 \\ Vp \\ -Up \\ 0 \\ 0 \\ 0 \end{bmatrix}, G_S = \begin{bmatrix} 0 \\ -p\sin\theta \\ p\cos\theta \\ 0 \\ -u \\ -v \end{bmatrix}, \tag{8}$$

with the notations of J in (5), and $$\theta = tg^{-1}\left(\frac{v}{u}\right). \tag{9}$$

The equations (7) are called the two-dimensional time-dependent Euler equations in the stream-function formulation. In the equations (8), where the first and fourth elements in the $F_s$ and $G_s$ are zero, which means that for the computing grid in the stream-function plane there apparently are no convection flux going through the cell interfaces for the continuity and energy equations in direction, which not only mostly reduce the error from the approximation to convection flux but also make the numerical solution of a class of inverse problem about aerodynamic body geometry design more accurate and efficient.

Following the publicly known characteristics analysis method for partial difference equation (PDE), we obtain the characteristic curve equations for the equations (7). They are $$d\lambda/d\tau = \pm(a/J)\sqrt{U^2 + V^2}; \tag{10}$$

$$d\lambda/d\tau = 0; \tag{11}$$

$$d\xi/d\tau = \pm a/J; \tag{12}$$

$$d\xi/d\tau = 0, \tag{13}$$

where a is the speed of sound.

The characteristics equations along the characteristic curve (10-11) respectively are $$dp \pm \rho a \frac{\sqrt{U^2 + V^2}}{V} du = 0; \tag{14}$$

$$dp \pm \rho a \frac{\sqrt{u^2 + v^2}}{u} dv = 0. \tag{15}$$

As mentioned above, for inviscid flows, the solid-wall boundary of aerodynamic body is a streamline and any streamline in flow field has its own stream-function with a constant value. For the two-dimensional cases, a new idea to solve the inverse problem is to solve the Riemann problem on the unspecified solid-wall, which is streamline and also a interface of the computing grid in the stream-function plane. So-called Riemann problem is publicly known.

In this invention, across the streamline presenting the unspecified solid-wall geometry, rewrite (7) only in $\xi$-direction, $$\frac{\partial f}{\partial \tau} + \frac{\partial G(f)}{\partial \xi} = 0, f = \begin{cases} f_L, & \xi < 0, \\ f_R, & \xi > 0, \end{cases} \tag{16}$$

where $f_L$ and $f_R$ respectively are the conservation variables at the left and right state of the cell interface, which is also a streamline presenting the solid-wall. The subscript L, R and * are for the left, right and middle state respectively in the Riemann problem. The FIG. 1 presents the definition of the two-dimensional Riemann problem across streamline presenting solid-wall. According to this definition, the left state $Q_L$ or the right state $Q_R$ is the shock or the expansion wave, which is expressed by the characteristic curve (10) or (12), between which, being the middle state, is the contact wave, which expressed by the (11), which divides the middle state into the left middle state $Q_{*L}$ and right middle state $Q_{*R}$.

The task is to find the values of the primitive variables p, $\rho$, u, v from f to obtain G at cell interfaces (the streamline presenting the solid-wall). The primitive variables are the variables in the middle region in the Riemann problem. The solving procedure is following.

Connecting the left and right states to the middle state by integrating along the characteristics equations (14-15), then we have $$\begin{cases} p_* + C_L \cdot f(u_*, v_*) = p_L + C_L \cdot f(u_L, v_L), & (17) \\ p_* - C_R \cdot f(u_*, v_*) = p_R - C_R \cdot f(u_R, v_R), & (18) \\ \rho_{*L} + f(u_*, v_*)(\rho_L/a_L) = \rho_L + f(u_L, v_L)(\rho_L/a_L), & (19) \\ \rho_{*R} - f(u_*, v_*)(\rho_R/a_R) = \rho_R - f(u_R, v_R)(\rho_R/a_R), & (20) \end{cases}$$

where $C_L = \rho_L a_L$; $C_R = \rho_R a_R$; and $$f(u, v) = \frac{1}{2} \frac{v\sqrt{u^2 + v^2}}{u} + \frac{1}{2} u \ln(v + \sqrt{u^2 + v^2}). \tag{21}$$

f(u, v) is called the combination function, which can be considered as the combination of the velocity component (u, v) in the stream-function plane and have the same role as the velocity term with dimension [m/s]. The (21) has its polar formulation as $$f_\Delta(V, \theta) = \frac{V}{2}(tg\theta + \cos\theta \ln((1 + \sin\theta))) + \frac{\cos\theta}{2} V \ln V, \tag{22}$$

with $V = \sqrt{u^2 + v^2}$, $u = V \cos\theta$, $v = V \sin\theta$

When solving the equations (17-20), it needs to add two layers computing cells around the computational domain, where the algorithm is extended. The solutions of (17-20), the solution of the Riemann problem on the solid-wall, give the primitive variables in the middle state. They are $$\begin{cases} p_* = \dfrac{C_R p_L + C_L p_R + C_L C_R [f(u_L, v_L) - f(u_R, v_R)]}{C_L + C_R}, & (22) \\ f(u_*, v_*) = \dfrac{C_L \cdot f(u_L, v_L) + C_R \cdot f(u_R, v_R) + [p_L - p_R]}{C_L + C_R}, & (23) \\ \rho_{*L} = \rho_L + (f(u_L, v_L) - f(u_*, v_*))(\rho_L / a_L), & (24) \\ \rho_{*R} = \rho_R + (f(u_*, v_*) - f(u_R, v_R))(\rho_R / a_R). & (25) \end{cases}$$

The computing cells on the solid-wall boundary are for the left or right state in the Riemann problem; while two added layers of computing cell along the solid-wall are to for the mirror state to that in the boundary cells. For example, the subscript L is for the variables in the added cell and the subscript R is for those in the wall boundary cells. $\theta_w$ is the angle of the solid-wall. The FIG. 2 shows the mirror relationship between the variables in the solid-wall boundary and those in the added cells. In detailed, they are $$\left. \begin{array}{l} p_L = p_R, \rho_L = \rho_R, \\ \theta_L = 2\theta_w - \theta_R, \text{ or } \theta_w = \dfrac{1}{2}(\theta_L + \theta_R), \\ V = V_L = V_R = \sqrt{u_R^2 + v_R^2}, u_L = V\cos\theta_L, v_L = V\sin\theta_L, \end{array} \right\} \quad (26)$$

According to the (22-25) and (26), one can find that $$p_* = p_R; \quad (27)$$

$$\rho_{*L} = \rho_{*R} = \rho_R + \frac{1}{2}(f_\Delta(V_R, \theta_L) - f_\Delta(V_R, \theta_R))(\rho_R / a_R). \quad (28)$$

For the pressure in the middle state, it is the pressure on the solid-wall, $p_w$, which means $$p_w = p_*. \quad (29)$$

If the pressure distribution on the solid-wall is given already, it can directly applied as the pressure in the middle state in the Riemann problem. Then $$p_* = p_w, \quad (30)$$

From which and the equation (22), ones have $$p_w = p_R + \frac{\rho_R a_R}{2}(f_\Delta(V_R, \theta_L) - f_\Delta(V_R, \theta_R)), \quad (31)$$

where $p_R, \rho_R, a_R, V_R, \theta_R$ are the known in the boundary cells and f, according to (21-22), is derived from (31)

$$f(V_R, \theta_L) = f(V_R, \theta_R) + \frac{2(p_w - p_R)}{\rho_R a_R}, \quad (32)$$

which is the combination function based on the given pressure and gives $\theta_L$, the flow angle in the added cells if the pressure $p_w$ is given.

The procedure to find the solid-wall angle based on the pressure distribution also needs to do the following steps.

Firstly, it needs to define $$tg\theta_L = \epsilon. \quad (33)$$

The velocity components in the added cells are obtained by $$u_L = V_R \cos\theta_L = \frac{V_R}{\sqrt{1+\epsilon^2}}; v_L = V_R \sin\theta_L = \frac{\epsilon V_R}{\sqrt{1+\epsilon^2}}, \quad (34)$$

which are bring into the combination function (22). It is modified as the function of $\epsilon$, $$F(\epsilon) = \frac{V_R}{2}\left(\epsilon + \frac{\ln V_R + \ln(\sqrt{1+\epsilon^2} + \epsilon) - \ln\sqrt{1+\epsilon^2}}{\sqrt{1+\epsilon^2}}\right) - \\ f(V_R, \theta_R) - \frac{2(p_w - p_R)}{\rho_R a_R}. \quad (35)$$

The work needs to do is numerically to solve the equation $F(\epsilon)=0$ with a given physical parameters $\rho_R, p_R, V_R, \theta_R$ and $p_w$ to find $\epsilon$ for $\theta_L$. The equation (35) does have the differentiability and its first-order derivative of F in respect to $\epsilon$ is, $$F'(\epsilon) = \frac{V_R}{2}\left(\frac{(2+\epsilon^2)\sqrt{1+\epsilon^2} - \epsilon - \epsilon(\ln V_R + \ln(\sqrt{1+\epsilon^2} + \epsilon) - \ln\sqrt{1+\epsilon^2})}{(1+\epsilon^2)^{3/2}}\right). \quad (36)$$

Numerical experiments show that for the non-dimensional velocity $V_R \leq 5$ (subsonic flows) and $\epsilon \in [-1,1]$, $F'(\epsilon)>0$, which means that the function $F(\epsilon)$ is monotone within this domain; in the mean time, $F(-\epsilon) \cdot F(\epsilon)<0$, 所以 Newton-Raphson so that the Newton-Raphson iteration as a root-finding algorithm is a good way to find the root $\epsilon$ for the equation (35) with a given $V_R$, $$\epsilon^{n+1} = \epsilon^n - \frac{F(\epsilon^n)}{F'(\epsilon^n)}. \quad (37)$$

The flow angle in added cells can be recovered by $\theta_L = tg^{-1}(\epsilon^{R+1})$. The solid-wall angle $\theta_w$ can be found by using the mirror relationship in (26), $$\theta_w = 1/2(\theta_L + \theta_R). \quad (38)$$

FIG. 3 gives the flow chart for solving the inverse geometry design problem. This method starts from the guessed flow filed physical values and solid-wall angle, the Riemann solver with the specified pressure distribution applied on the solid-wall boundary will gives the flow angles in added cells, then the wall angle can be obtained and substituted back to the flow solver for updating the physical variables. This procedure will continue until an iterated solid-wall angle within the convergence tolerance is reached. It is obvious that the convergent criteria is the solid-wall angle instead of any physical parameter, which means that the solid-wall angle become a flow field variable. The change of the boundary each iteration does not change the characteristics of the equations and the equations are still the strong-hyperbolic system; therefore, it is still a well-posed initial problem. Compared to the methods, such as the adjoint method, the present method needs neither the step of the grid generation for the updated geometry shape, nor the step of solving the adjoint equation. It obtains the convergent physical solutions in flow field and the geometry shape concurrently, which will be the one-shot and optimal method in the inverse geometry shape design problem. The total CPU time for this class problem will reduce the order of one.

PREFERRED EMBODIMENT

Figure 1:
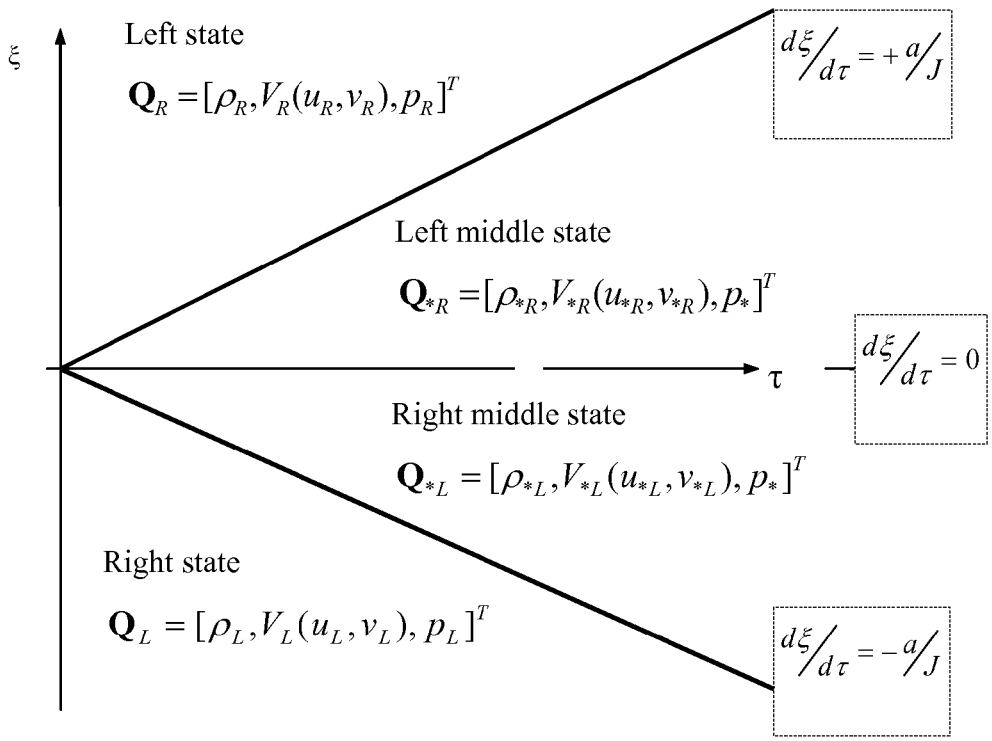
FIG. 1 is the Riemann problem across streamline in $\xi$-direction in the stream-function plane.
Figure 2:
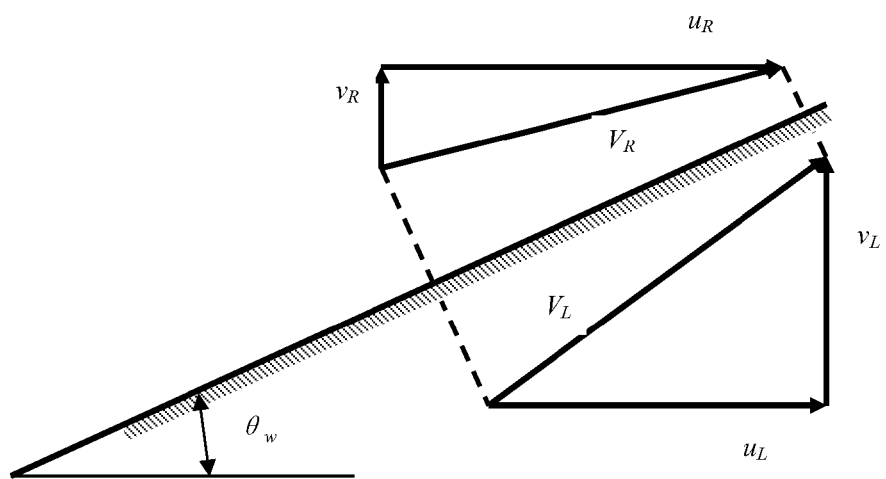
FIG. 2 is the mirror relationship between the variables in the solid-wall boundary and those in the added cells.
Figure 3:
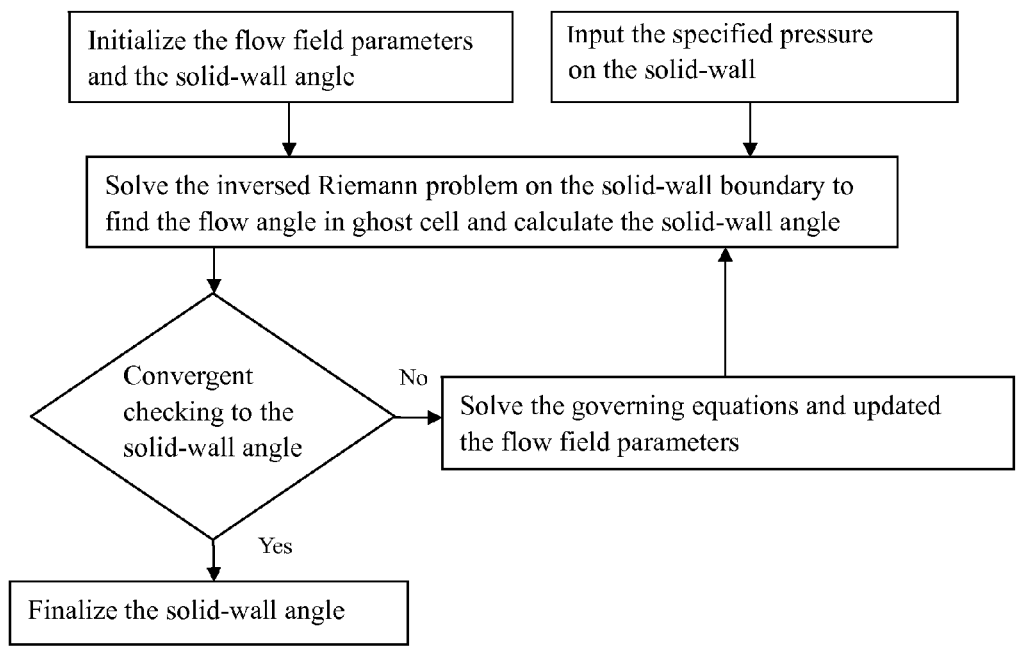
FIG. 3 is the flow chart of solving an inverse problem for geometry shape design.
Figure 4:
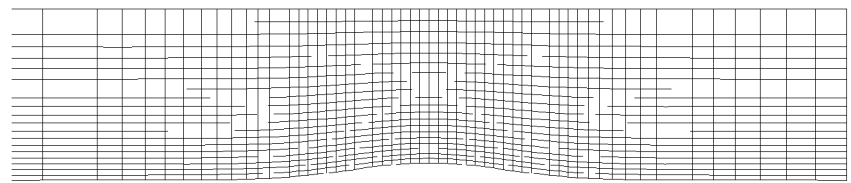
FIG. 4 is the calculated geometry shape of the solid-wall based on the prescribed pressure distribution.
  (a) Computing grid in the Eulerian plane.
  (b) Calculated Pressure distribution on the solid wall by JST and the exact solution.
  (c) Computing grid in the stream-function plane.
  (d) Designed solid-wall by the present invention
Figure 4:
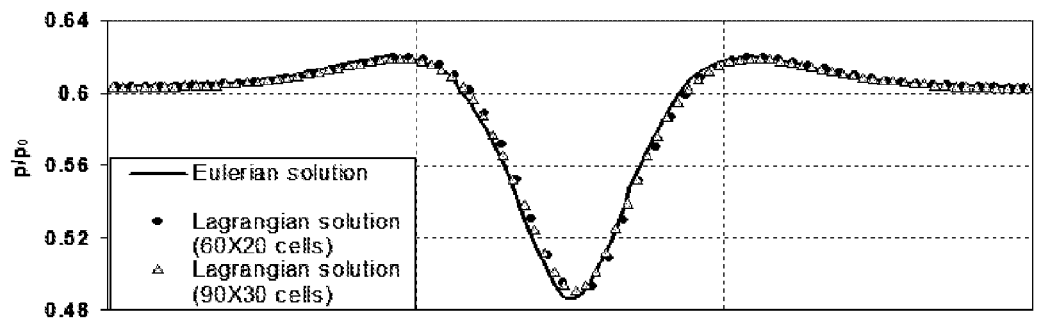
Figure 4:
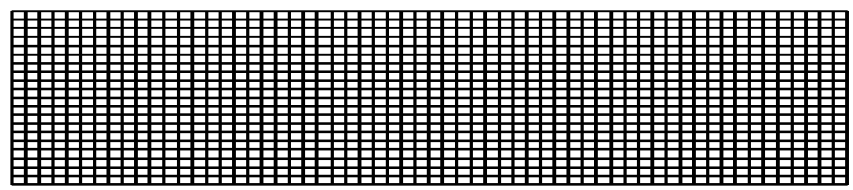
Figure 4:
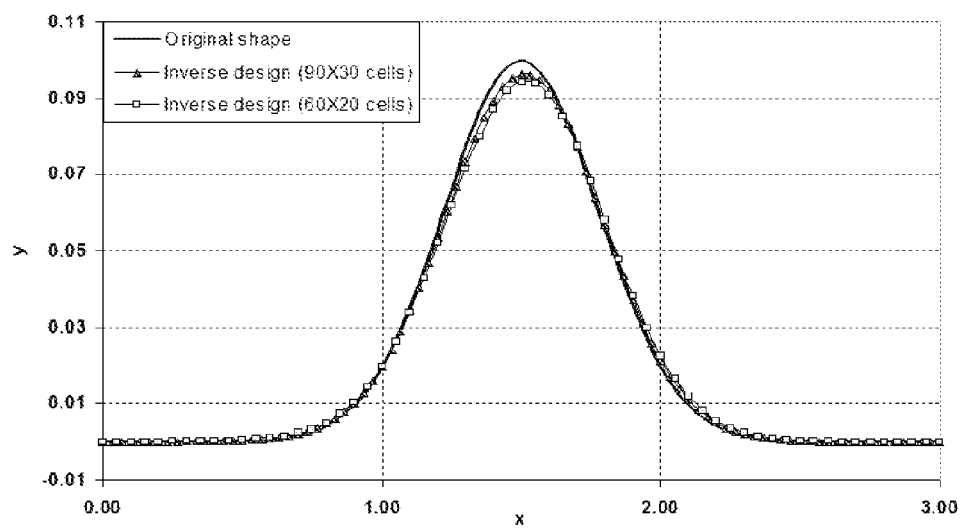

An example is to show the detail how to find the geometry of a solid-wall according to the present invention. It is a numerical method for solving an inverse problem, which is the shape design of aerodynamic body in inviscid subsonic flows. The invented method is implemented using computer language codes and the codes are run on computer to calculate the geometry shape of aerodynamic body based on given pressure distribution on the body. The geometry of the example is a convergent-divergent nozzle. Since the prescribed pressure distribution on the geometrically-unspecified solid-wall need to be input in the inverse problem, one can firstly specify this nozzle shape and find the pressure distribution, then use this pressure as the input to find the geometry shape by the invented method. The calculated shape should match with the original shape. The profile of the nozzle's solid-wall is given by a function $$y = H_{th} e^{-\beta x^2}, \quad -1 \leq x \leq 1 \qquad (39)$$

where $H_{th}$ is 0.1 meaning the 10% bump high of the inlet and $\beta$ is 6.5 to control the smoothed convex part which counts about a third of the channel length. For an inlet Mach number of 0.5, it is a pure subsonic flow. The computing grid for this geometry in Eulerian plane is given in FIG. 4 (a). the pressure distribution on the solid-wall firstly obtained by the publicly known JST method, like in the FIG. 4(b), which is used as an input of the prescribed pressure distribution in the inverse geometry shape design problem. Meanwhile, the adjoint method is run as a comparison to check the computational efficiency of the present invention. Totally 60×20 and 90×30 uniform cells in the stream-function plane. The computation is taken the following steps.

(1) Initializing the flow field and the solid-wall angle. The flow field variables $Q^0 = [\rho^0, u^0, v^0, p^0]^T$ and $U^0, V^0$ are set as initial conditions, and finding the conversation variable $f^0$, where $Q^0$ take the values at the infinite and $U^0=0$; $V^0=1$. The superscript 0 means that the initial conditions of a flow problem are given at $t=0$ ($\tau=0$) in x-y plane and $\lambda$-$\xi$ plane. The initial angle of the solid-wall $\theta_w = 0°$. Since the flow angle in the flow field is set as zero, then the flow angle in the added cells $\theta_L = 0°$. The computing grid in the stream-function plane is shown in the FIG. 4(c).

(2) Imputing the prescribed pressure distribution on the solid-wall $p_w$.

(3) Solving the Riemann problem across streamline presenting the solid-wall boundary based on $p_w$, according to (30-37), to find $\theta_L$.

(4) Calculating the solid-wall angle. It can be calculated based on the mirror state condition, $$\theta_w = 1/2(\theta_R + \theta_L). \qquad (40)$$

(5) Checking the convergence of the solid-wall angle. The variations of the solid-wall angle is the difference of $\theta_w$ between the time step n+1 and n, $$\delta\theta_w = (\theta_w^{n+1} - \theta_w^n). \qquad (41)$$

IF $\delta\theta_w$ is smaller than the convergent tolerance, then the flow field and solid-wall angle come to the final solution $\theta_w^{n+1}$. Otherwise, continuing the next steps.

(6) Updating the flow field. The task of this step is to calculate the flow field physical parameters from $[Q]_{i,j}^n$ to $[Q]_{i,j}^{n+1}$ based the updated solid-wall angle $\theta_w n^{+1}$. After this step, the new flow field parameters $(\rho_R, p_R, V_R, \theta_L)$.

(7) Repeating step (2).

The FIG. 4(d) shows the graphic comparison of the calculated and original solid-wall shapes. From the results, we can numerically evaluate the precision of the resolution. The computed geometrical shape is found in good agreement with the original shape used as the input; the maximum error is limited within 0.5%. The totally CPU time is only tenth of that by the adjoint method.

REFERENCE

[1] Antony Jameson, A.: *Aerodynamic Shape Optimization Using the Adjoint Method*, Lecture Series at the Von Karman Institute, Feb. 6, 2003.
[2] Mateescu, D.: *Analysis of aerodynamic problem with geometrically unspecified boundaries using an enhanced Lagrangian method*. Journal of Fluids and Structures, 17, pp. 603-626, 2003.
[3] Stanitz, D. John: *A review of certain inverse methods for the design of duct with 2-or 3-dimensional potential flow*. Appl. Mech. Rev. Vol. 41, No. 6, June 1988.

What is claimed is:

1. A computer implemented numerical method for solving an inverse problem in subsonic flows, comprising:
  transforming a set of two-dimensional Euler equations in the Eulerian plane, using a transforming matrix with Jacobian $$J = \begin{pmatrix} 1 & 0 & 0 \\ u & \cos\theta & U \\ v & \sin\theta & V \end{pmatrix},$$

into a stream-function transformation in a stream-function plane expressed by a time $\tau$-direction, a stream-function $\xi$-direction and a particle traveling distance $\lambda$-direction, so-called two-dimensional Euler equations in the stream formulation in the stream-function plane formally are $$\frac{\partial f_s}{\partial \tau} + \frac{\partial F_s}{\partial \lambda} + \frac{\partial G_s}{\partial \xi} = 0,$$

where $f_s$ is conservation vector, $F_s$ and $G_s$ are respectively convection flux along the $\lambda$-direction and the $\xi$-direction in the stream-function plane, and $$f_S = \begin{bmatrix} \rho J \\ \rho Ju \\ \rho Jv \\ \rho JE \\ U \\ V \end{bmatrix}, F_S = \begin{bmatrix} 0 \\ Vp \\ -Up \\ 0 \\ 0 \\ 0 \end{bmatrix}, G_S = \begin{bmatrix} 0 \\ -p\sin\theta \\ p\cos\theta \\ 0 \\ -u \\ -v \end{bmatrix}, \theta = tg^{-1}\left(\frac{v}{u}\right),$$

where ρ, p, and E are respectively density, pressure and total energy, u, v are two velocity components in a Cartesian coordinator system; U, V are two stream-function geometry state variables;

building a computing grid in the stream-function plane, using the computer;

solving so-called two-dimensional Euler equations in the stream-function formulation in the computing grid in the stream-function plane, using the computer, including solving a Riemann problem across a streamline presenting a solid-wall with a prescribed pressure distribution on the solid-wall to determine a flow angle;

calculating a solid wall angle associated with the solid wall based on the determined flow angle; and determining a geometric shape of an aerodynamic solid-wall of a nozzle using the prescribed pressure distribution on the solid wall and the solid wall angle, wherein the determined geometric shape matches with an original geometric shape of the solid wall of the nozzle.

2. The method of claim 1, wherein said computing grid is a rectangular grid constructed with the λ-direction and the ξ-direction in the stream-function plane.

3. The method of claim 1, wherein said solving the two-dimensional Euler equations in the stream-function formulation in the stream-function plane needs to literately update the conservation variable $f_s$ along the τ-direction until obtaining a steady $f_s$ in the subsonic flows.

4. The method of claim 1, wherein said Riemann problem across a streamline presenting a solid-wall has the following property: an existing state and its solid-wall-mirrored state divided by shocks or expansion waves as a left state and a right state, between the two states exists a middle state, which is divided as a left middle state and a right middle state by a contact wave presenting the solid-wall.

5. The method of claim 1, wherein said solving a Riemann problem across a streamline presenting a solid-wall has the following steps:

(1) initializing flow parameters and the solid-wall angle;
(2) inputting specified pressure distribution along solid-wall;
(3) finding the solid-wall-mirrored in the Riemann problem across the streamline presenting the solid-wall;
(4) calculating the solid-wall angle;
(5) checking convergence of the calculated solid-wall angle, and finishing if it is converged;
(6) updating the flow parameters; and
(7) repeating step (3).

6. The method of claim 5, wherein said finding the solid-wall-mirrored in the Riemann problem across the streamline presenting the solid-wall includes the following steps:

(1) connecting the left state and the right state to the middle state by integrating along characteristic equations of the Euler equations in the stream-function formulation;
(2) recovering a velocity magnitude in the middle state;
(3) solving a combination function f(u, v) to find a flow angle in the middle state;
(4) finding the velocity components in the star state.

7. The method of claim 6, wherein said recovering velocity magnitude in the middle state is implemented according to a Rankine-Hugoniot relations across the shocks and Enthalpy constants across the expansion waves.

8. The method of claim 6, wherein said combination function f(u, v) is expressed as $$f(u, v) = \frac{1}{2} \frac{v\sqrt{u^2 + v^2}}{u} + \frac{1}{2} u \ln\left(v + \sqrt{u^2 + v^2}\right);$$

if the pressure distribution on the solid-wall is specified, it is expressed as $$f(V_R, \theta_L) = f(V_R, \theta_R) + \frac{2(p_w - p_R)}{\rho_R a_R},$$

where $p_R$, $\rho_R$, $a_R$, $V_R$, $\theta_R$ being the flow parameters in computing cells on the solid-wall; $p_w$ being the specified pressure distribution on the solid-wall; $\theta_L$ being the flow angle in the solid-wall mirrored state.

\* \* \* \* \*